March 1, 1966  H. D. DAIGH ETAL  3,237,616
RECYCLE VALVE
Filed July 6, 1964  4 Sheets-Sheet 1
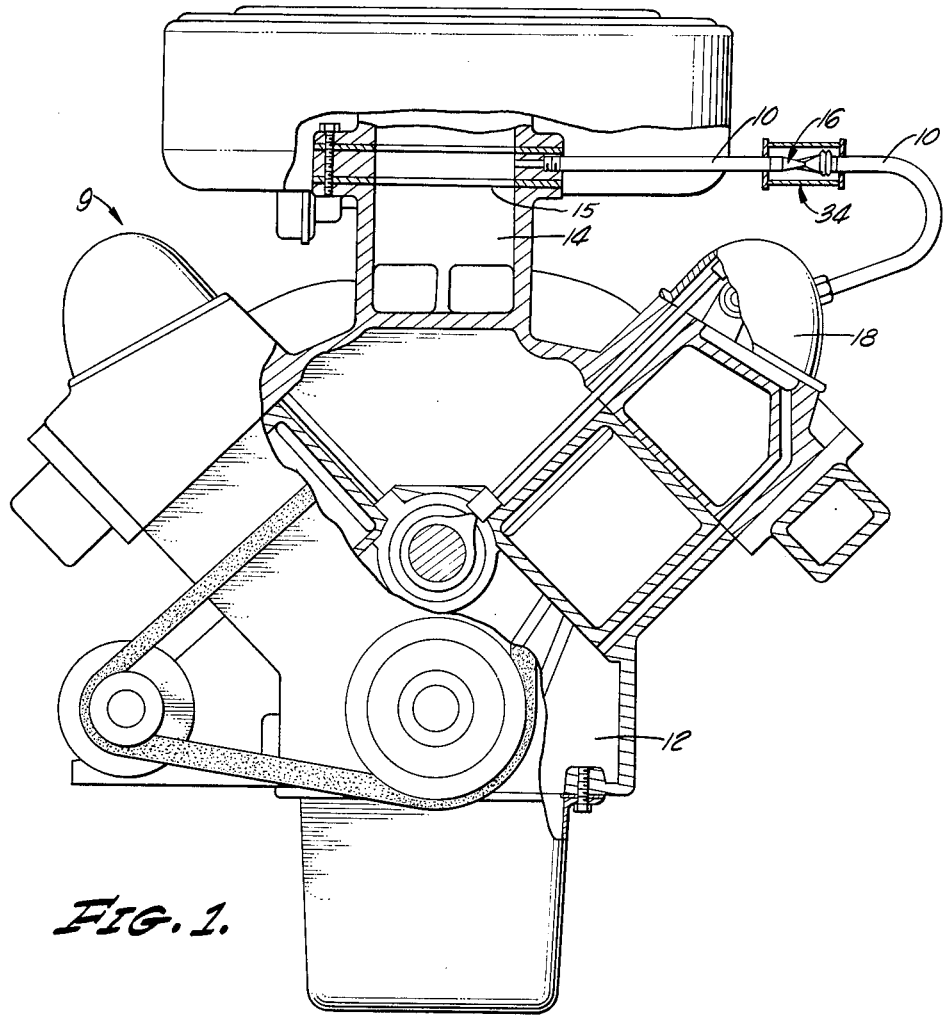
FIG. 1.
FIG. 2.
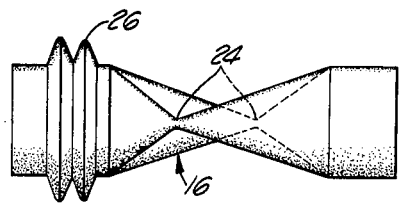
INVENTORS.
HAROLD D. DAIGH
LAWRENCE M. RICHARDS
BY
Donald W Canady
ATTORNEY March 1, 1966   H. D. DAIGH ET AL   3,237,616
RECYCLE VALVE Filed July 6, 1964   4 Sheets-Sheet 2

INVENTORS.
HAROLD D. DAIGH
LAWRENCE M. RICHARDS
BY
Donald W Canady
ATTORNEY

March 1, 1966 H. D. DAIGH ET AL 3,237,616
RECYCLE VALVE
Filed July 6, 1964 4 Sheets-Sheet 3

INVENTORS
HAROLD D. DAIGH
LAWRENCE M. RICHARDS
BY
Donald W Canady
ATTORNEY

March 1, 1966 H. D. DAIGH ETAL 3,237,616
RECYCLE VALVE
Filed July 6, 1964 4 Sheets-Sheet 4

INVENTORS.
HAROLD D. DAIGH
LAWRENCE M. RICHARDS
BY
Donald W Canady
ATTORNEY

United States Patent Office 3,237,616
Patented Mar. 1, 1966

1

3,237,616
RECYCLE VALVE
Harold D. Daigh, Rolling Hills Estates, and Lawrence M. Richards, La Habra, Calif., assignors to Richfield Oil Corporation, Los Angeles, Calif., a corporation of Delaware
Filed July 6, 1964, Ser. No. 380,196
11 Claims. (Cl. 123—119)

The present invention relates to internal combustion engines and more particularly to tubular valve apparatus for controlling the recycle flow in a crankcase recycle system of an internal combustion engine.

The recovery of crankcase and engine fumes from an internal combustion engine by recycling such fumes into the induction system aids in reducing crankcase dilution from sludging and preventing discharge of such fumes into the atmosphere which would contribute to air pollution. U.S. Patent No. 3,077,871, Harold D. Daigh, for "Crankcase Ventilating System for Internal Combustion Engines" discusses some of the prior art recycle devices and proposes the use of a tubular valve positionable in a conduit externally connecting the crankcase and the induction system which tubular valve is normally closed in response to induction manifold vacuum and adapted to open in response to crankcase pressure buildup to thereby pass blowby fluids from the crankcase through the conduit into the induction system. It has been found desirable as set forth in co-pending application, S.N. 301,483, filed March 5, 1963, now U.S. Patent No. 3,157,467, Harold D. Daigh and Rondo H. Patzig for "Crankcase Ventilator Device," that it is desirable to position the tubular valve between the open conduit ends under a slight tension in order to facilitate opening the valve at the preformed closed section in response to relatively small pressure on the crankcase side of the tubular valve. The disclosures of both of the aforementioned patents are incorporated herein by reference.

The device disclosed in the aforementioned Daigh et al., patent application for tensioning the tubular crankcase recycle valve positioned in the conduit between the crankcase and the induction system, increases the cost of the valve shown in Patent No. 3,077,871, and involves certain adjustability features which can be altered to the detriment of the ventilating system, when altered by an unskilled mechanic. Also, the tubular valve is made of resilient material which is subject to deterioration and damage unless it is enclosed and thereby protected from excessive atmospheric exposure and accidental damage.

It is therefor an object of our present invention to provide an improved low-cost tubular valve apparatus adapted for positioning under slight tension in a conduit passing blow-by fumes from the crankcase to the induction system of an internal combustion engine.

It is also an object of our present invention to provide a tubular valve having integral tensioning means thereon and being adapted to close in response to vacuum imposed through said tubular valve and open in response to pressure applied through said valve.

It is also an object of our present invention to provide a tubular crankcase recycle valve apparatus having means for mounting and protecting said valve.

Other objects and a more complete understanding of our present invention will become apparent by reference to the following specification and the appended claims when taken in conjunction with the following drawings, wherein:

FIG. 1 shows in partial section an internal combustion engine utilizing the recycle control valve apparatus of our present invention;

2

FIG. 2 shows in elevation an enlarged tubular recycle control valve in accordance with our present invention;

Figure 3:
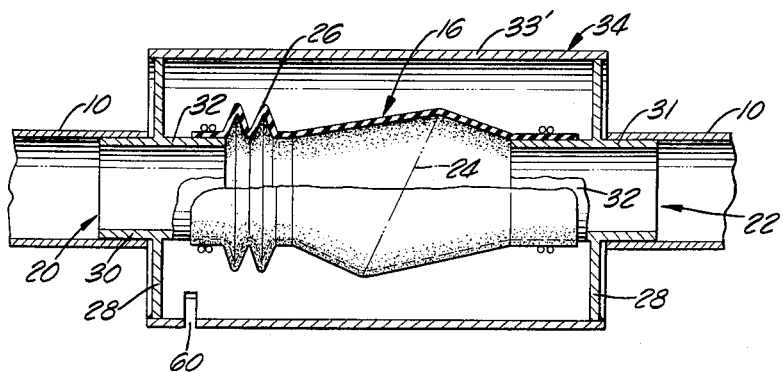
FIG. 3 shows the tubular valve of FIG. 2 rotated 90° about a horizontal axis and mounted in a protective enclosure.

With reference to the drawings generally, the tubular valve 16 described in the aforementioned U.S. patents is positioned at a discontinuity between the ends 20 and 22 (see FIG. 3) of conduit 10 which extends between the crankcase and the induction system of an internal combustion engine as shown in FIG. 1. The valve 16 is of the type described in the aforementioned patents in that it controls the recycle of the blow-by fumes from the crankcase to the induction system, and is of the type which is normally closed by induction manifold vacuum whereby the induction of dirt, oil, etc., from the crankcase is prevented. The valve 16 may, however, be opened by pressure in the crankcase which may otherwise cause a leak of crankcase or blow-by fumes in the atmosphere, as the pressure from the crankcase is exerted on the closed section 24 of the valve 16.

Briefly, the present invention relates to an internal combustion engnie 9 having a conduit 10 externally connecting the crankcase 12 and the induction system 14 with a valve 16 positioned in a break in the conduit 10 to control the recycle of blow-by fluids from the crankcase into the induction system. The conduit 10 is connected to the induction manifold 14 below the carburetor through a distribution plate 15. For convenience of illustration, the embodiment of our present invention illustrated, shows the conduit extending to the induction system from the rocker arm cover 18 although the conduit may be connected to any portion of the engine which is in fluid communication with crankcase pressure, and in this sense a conduit connected to the rocker arm cover as shown is a conduit connected to the crankcase of the internal combustion engine. Our present invention relates to a novel valve element 16 and means for mounting the same in tension whereby the valve apparatus is foolproof in that after preadjustment by the manufacturer, it is non-adjustable and thus tamper-proof.

It has been found, as previously mentioned, that subjecting the tubular valve to a slight tension facilities the opening of valve 16 in response to a relatively small pressure build-up in the crankcase, thus reducing any tendency towards crankcase leakage. When it is desirable to impose a slight vacuum on the crankcase through the recycle control valve, the tension on the tubular valve can be preset to prevent complete closing of valve 16 at relatively small vacuum valves. Under such conditions, crankcase ventilation is accomplished by providing a line from the clean air side of the air cleaner to the crankcase as shown in the aforementioned Daigh et al. patent, or by utilizing an oil fill cap designed for one-way flow (not shown). A flame arrestor is preferably provided in the conduit 10 or the ventilator conduit (not shown) to prevent crankcase explosions due to backfiring.

The tubular valve 16 of our present invention is shown in FIGS. 3–9 mounted in a tube support device 34 which serves to hold the conduit ends 20 and 22 (FIG. 3) in substantially axial alignment and to provide a protector for the tubular valve element 16 which when made of ordinary construction materials is subject to atmospheric deterioration when exposed excessively to the atmosphere, and to mechanical damage which results from the positioning of the tubular valve in an accessible area under the hood. The bellowed section 26 of tubular valve 16 provides the valve with self contained tensioning means although as will hereinafter be described, additional tensioning means may be provided in accordance with our present invention.

Figure 9:
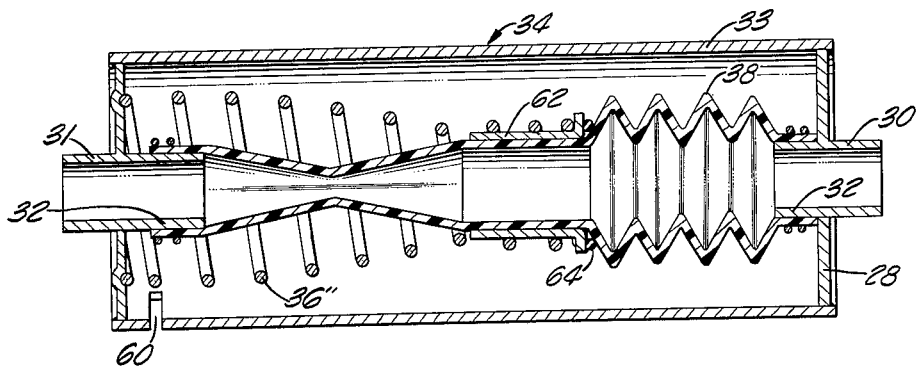

The tube support apparatus 34 consists essentially of a pair of apertured end covers 28 fitted with an entry tube 30 and an exit tube 31 to provide for connection to the conduit ends 20 and 22, as shown in FIG. 3. The entry and exit tubes 30 and 31 are also provided with inwardly extending portions 32 to which the tubular valve element 16 may be operatively connected. The end cover 28 may, for example, be an apertured plate with a short piece of tubing positioned through the aperture whereby one end of the tubular valve element 16 can be affixed to one conduit end 20 and the other end of tubular valve affixed to conduit end 22. A cylindrical sleeve 33 may be affixed to the end supports as by welding as shown in FIGS. 3, 4, 5, 7, and 8, or by crimping as shown in FIGS. 6 and 9. FIG. 3 shows the tubular valve element 16 affixed to the tube inwardly extending portions 32 of the entry and exit tubes of the valve support apparatus. A slot 60 is provided in the sleeve 33 to permit ventilation of the tube support device and prevent an internal pressure differential in the enclosure tube support device 34.

As shown in FIGS. 2 and 3, the tubular valve 16 is made collapsible by flattening a section 24 of the tube in the manufacture thereof. The "crease" 24 traverses the tubular valve so that axial flow through the tube and conduit can be stopped as the tube is closed by manifold vacuum. Preferably the crease 24 is inclined at slightly less than 90° to the longitudinal axis of the tube as shown in FIG. 2 and 3. This diagonal crease 24 facilitates opening of the tube in response to pressure buildup in the crankcase, because of the increased internal tube surface upon which the gas pressure can act.

Figure 4:
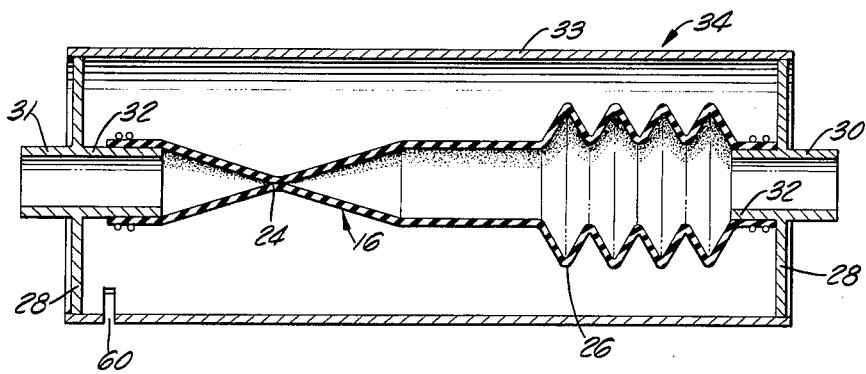
FIG. 4 shows in section an elevational view of a slightly modified form of the valve apparatus shown in FIGS. 2 and 3 with the valve in closed position.
Figure 5:
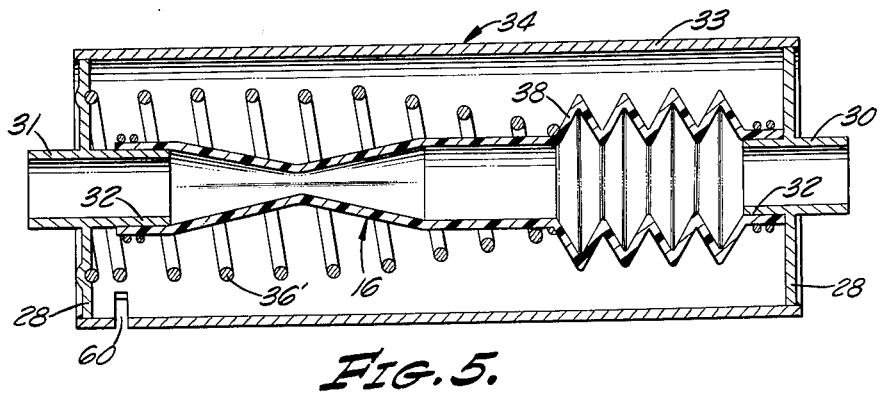
FIG. 5 shows the apparatus of FIG. 4 with tensioning spring with the valve in open position.
Figure 6:
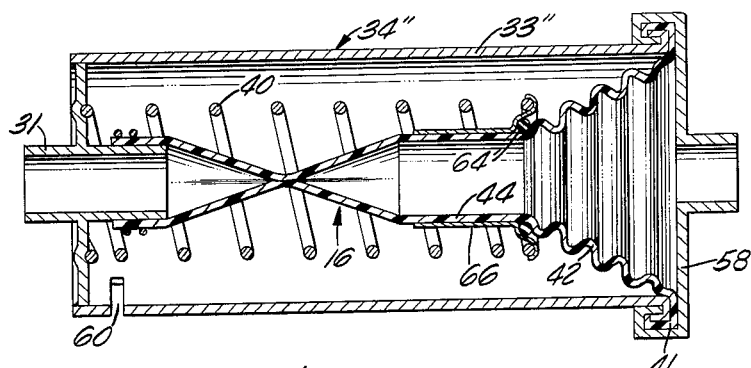
FIGS. 6–9 show various modifications of the valve apparatus of our present invention.

FIGS. 4 and 5 show the tubular valve device of our present invention in closed and opened positions respectively. A spring element 36 may be positioned around the tubular valve 16 from the gas exit end 28 to bellow surface 38 (FIG. 5) to provide tube or spring keeper 48 (FIGS. 7–9) tensioning in addition to that supplied by the bellows 26. The spring member of FIGS. 5, 7, 8, and 9 thus tensions the tubular valve between the bellow surface 38 and the gas exit end 27 of the valve support structure. Spring 36 is tapered at the bellow end to conform to the tube circumference adjacent the bellows as shown in FIG. 5. FIG. 9 shows a modification of the structure shown FIG. 5 wherein a keeper sleeve 62 is positioned around the gas entry side of the tubular valve.

FIG. 6 shows a modification of our present invention utilizing spring means for tensioning the tubular valve element wherein one end of the tubular element is widened and attached to the end cover 58 at the enclosure sleeve 34 to which the end cover is crimped thus forming a diaphragm member 42 which provides for axial movement of the tubular element 44 as induction manifold vacuum is released and the tubular element is tensioned by spring 46. The diaphragm section 42 of the tubular valve may be rippled or bellowed as in FIG. 6. A spring keeper 62 may be positioned between tube 16 and spring 46 to prevent contact of the spring with the tubular valve 16.

Figure 7:
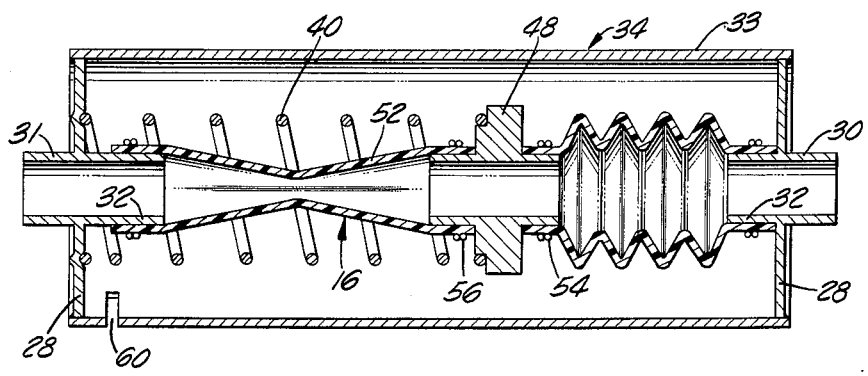
Figure 8:
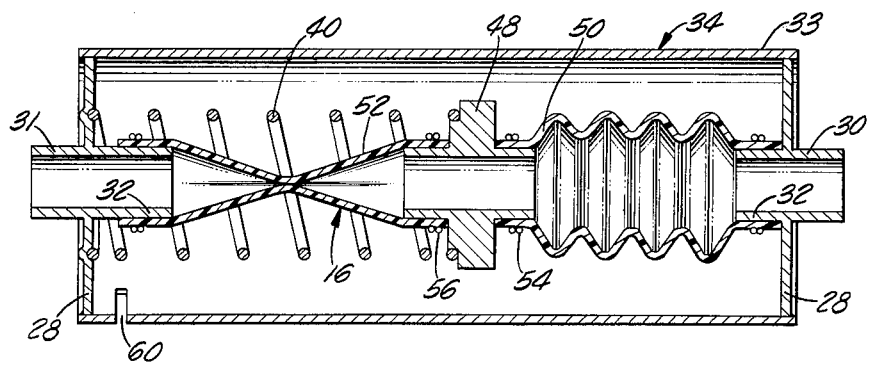

Another modification of our present invention is shown in FIGS. 7 and 8 wherein a spring keeper 48 is inserted between the tubular element bellow section 50 and gas exit end 52 of the tube and attached thereto by sealing rings 54 and 56.

Although the present invention has been described with a certain degree of particularity, it is to be understood that our invention is not to be limited to the details set forth but should be afforded the full scope of the appended claims.

We claim as our invention:

1. In a tubular valve structure having a preformed closed section traversing said tubular valve, wherein said valve is operatively connectible in conduit means providing fluid communication between the engine and the induction system of an internal combustion engine and wherein said valve is so arranged and constructed as to close said conduit means in response to manifold vacuum and open said conduit means in response to pressure buildup in said engine to thereby pass engine fluids through said conduit means from said engine into said induction system, the improvement comprising: bellows means formed in said tubular valve structure for tensioning said tubular valve in said conduit means.

2. The apparatus of claim 1 wherein said preformed closed section is inclined to the longitudinal axis of said tubular valve at an angle of less than 90°.

3. The apparatus of claim 1 wherein said bellows means are a bellowed diaphragm.

4. In a blow-by recycle valve means positionable in conduit means providing fluid communication between the crankcase and the induction system of an internal combustion engine, wherein said conduit means has a discontinuity therein between two open spaced apart conduit ends, and a flexible tubular valve is so arranged between said conduit ends as to close in response to manifold vacuum and open in response to crankcase pressure buildup to pass blow-up fluids from said crankcase through said conduit means into said induction system, the improvement comprising:
  a flanged gas entry tube adjacent to one of said conduit ends,
  a flanged gas exit tube adjacent said other conduit end,
  said tubes having means for affixing the ends of said tubular valve thereto,
  a sleeve connected to and extending between said tube flanges to thereby enclose said tubular valve.

5. The apparatus of claim 4 including means for tensioning said tubular valve.

6. The apparatus of claim 4 including a spring keeper in said tubular valve,
  and spring means operatively positioned between said keeper and said gas exit tube.

7. A valve means positionable in conduit means providing fluid communication between the engine and the induction system of an internal combustion engine of the type adapted to in response to manifold vacuum and open in response to pressure build-up in said engine to thereby pass blow-by fluids through said conduit means from said engine to said induction system, comprising:
  a rigid container adapted to be operatively inserted in said conduit means,
  said container having a pair of conduit receiving means disposed in spaced apart relationship,
  a flexible tubular valve positioned within said rigid container and adapted to form an internal fluid path between said conduit receiving means,
  and means in said container for tensioning said tubular valve.

8. A blow-by recycle valve means to provide fluid communication between the crankcase and the induction system of an internal combustion engine through a conduit means having a discontinuity therein between two spaced apart conduit ends, comprising:
  a rigid container having openings at each end of said container,
  said openings being connectible to said conduit ends,
  a flexible tubular valve positioned in said container,
  said valve being adapted to close in response to induction manifold vacuum and open in response to crankcase pressure buildup to pass blow-by fluids from said crankcase through said conduit means into said induction,
  and means for connecting said tubular valve to said end opening in said rigid container.

9. The apparatus claimed in claim 8 including means in said container for tensioning said tubular valve.

10. In a tubular valve structure adapted to close in response to vacuum on one end thereof and open in response to fluid pressure on the other end thereof, the improvement comprising: bellow means formed in said tubular valve.

11. In a crankcase ventilating system for internal combustion engine having an opening in the engine above the oil level through which blow-by fluids can escape the engine and conduit means providing fluid communication between said opening and the induction system of said engine,
 said opening being subject to the crankcase pressure, said conduit means having a discontinuity therein and two spaced apart conduit ends, wherein a flexible tubular valve means normally close in response to manifold vacuum end adapted to open in response to pressure buildup in said crankcase to pass blow-up fluids from said crankcase through said conduit means into said induction system is operatively positioned between said conduit ends, the improvement comprising:
 a rigid container adapted to positioned said tubular valve between said conduit ends,
 and means in said container associated with said tubular valve for subjecting said tubular valve to tension.

References Cited by the Examiner
UNITED STATES PATENTS

| | | | |
|---|---|---|---|
| 3,077,871 | 2/1963 | Daigh | 123—119 |
| 3,157,467 | 7/1964 | Daigh | 123—119 |

KARL J. ALBRECHT, *Primary Examiner.*